(12) United States Patent
Pham et al.

(10) Patent No.: US 6,259,396 B1
(45) Date of Patent: Jul. 10, 2001

(54) TARGET ACQUISITION SYSTEM AND RADON TRANSFORM BASED METHOD FOR TARGET AZIMUTH ASPECT ESTIMATION

(75) Inventors: Quoc H. Pham, Playa Del Rey; Albert Ezekiel, Los Angeles, both of CA (US)

(73) Assignee: Raytheon Company, Lexington, MA (US)

( * ) Notice: Subject to any disclaimer, the term of this patent is extended or adjusted under 35 U.S.C. 154(b) by 0 days.

(21) Appl. No.: 09/384,078

(22) Filed: Aug. 26, 1999

(51) Int. Cl.[7] .......................... G01S 13/00; G01S 13/89; G01S 13/90
(52) U.S. Cl. ................ 342/90; 342/25; 342/89; 342/91; 342/93; 342/175; 342/176; 342/179; 342/190; 342/191; 342/195
(58) Field of Search .................. 342/25, 26, 52, 342/53–58, 89, 91, 93, 175, 176, 179, 180, 190–197, 90, 159–164; 382/276–292

(56) References Cited

U.S. PATENT DOCUMENTS

| 4,768,156 | * | 8/1988 | Whitehouse et al. ............... 382/279 |
| 4,965,582 | * | 10/1990 | Hellsten ............................. 342/25 |
| 5,717,401 | * | 2/1998 | Sabet-Peyman et al. .......... 342/192 |

OTHER PUBLICATIONS

Q.H. Pham, et al, "Efficient end–to–end feature–based systems for SAR ATR," XP000956141 Proc. of SPIE, 1998, vol. 3370, pp. 519–529, ISSN: 0277–786X.

C. Nilubol, et al. "Translational and rotational–invariant Markov model for automatic target recognition," XP000956142 SPIE Proceedings, vol. 3374, pp. 179–185, ISSN: 0177–786X, 1998.

D.P. Kottke, et al, "A Design for HMM–Based SAR ATR," SPIE vol. 3370, pp. 541–551, ISSN: 0177–786x.

Pham, Quoc H., Brosnan, Timothy M., Smith, Mark J.T., Mersereau, Russell M., "An Efficient End–To–End Feature Based System for SAR ATR,"SPIE vol. 3370 (Apr. 1998).

Nilubol, Chanin, Pham, Quoc H., Mersereau, Russell M., Smith, Mark J.T., Clements, Mark A, "Translational and Rotational Invariant Hidden Markov Model for Automatic Target Recognition," SPIE vol. 3374 (Apr. 1998).

Kottke, Dane P., Fiore, Paul D., Brown, Kathy L., Sanders, Jong–Kae Fwu, "A Design for HMM–Based SAR ATR," SPIE vol. 3370 (Apr. 1998).

* cited by examiner

*Primary Examiner*—Bernarr E. Gregory
(74) *Attorney, Agent, or Firm*—Leonard A. Alkov; Glenn H. Lenzen, Jr.

(57) ABSTRACT

A Radon transform based method that provides for target azimuth aspect estimation and target shape measurement. A Radon transform is applied to a binary (N×N pixels) target chip to extract target features that are then used to measure length, width, and diagonal features of the target. In parallel, these features are used to estimate the azimuth aspect angle, or size, of the target. The method is effective in discriminating targets from clutter. The method is also very time efficient and highly flexible in its operation because the features can automatically account for any target rotation or shift. The present invention also provides for a target acquisition system that employs the Radon transform based method for target azimuth aspect estimation.

12 Claims, 3 Drawing Sheets

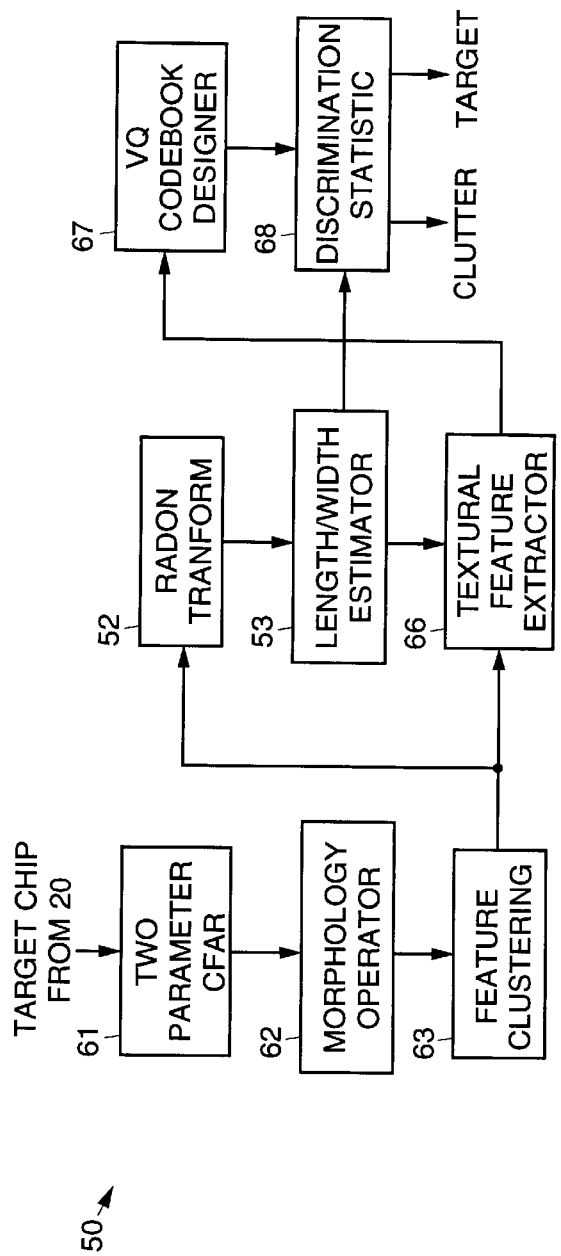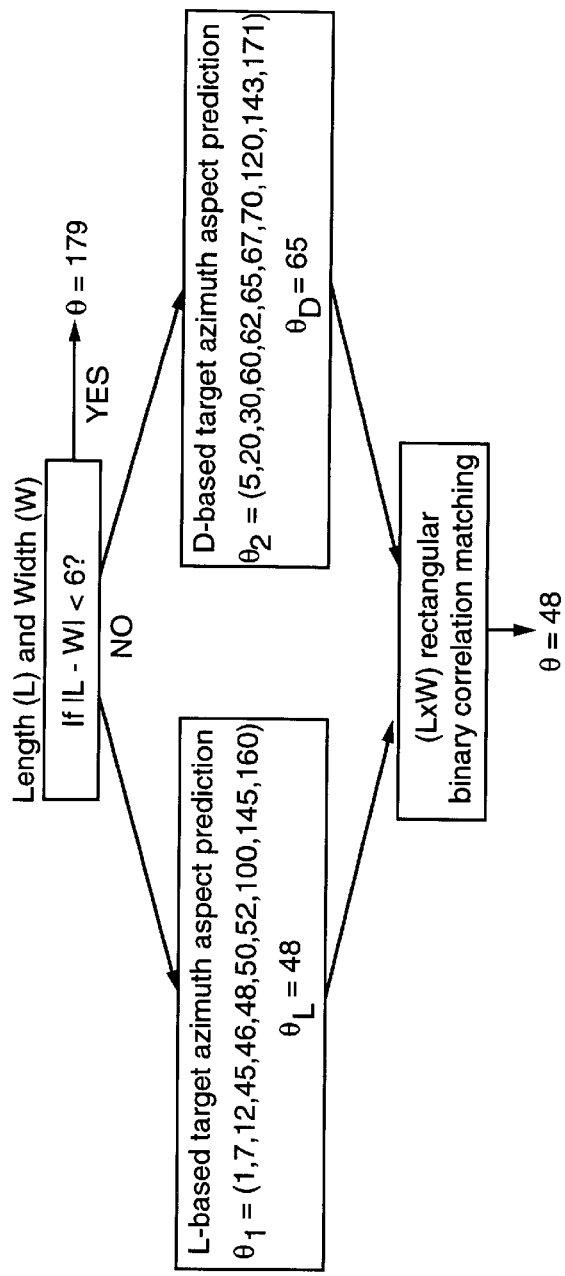

TARGET ACQUISITION SYSTEM AND RADON TRANSFORM BASED METHOD FOR TARGET AZIMUTH ASPECT ESTIMATION

BACKGROUND

The present invention relates generally to imaging systems, and more particularly, to a Radon transform based method for target azimuth aspect estimation for use with imaging systems and a target acquisition system using the method.

In prior art radar systems and signal processing methods used therewith, target azimuth aspect estimations place a target-sized rectangular template on an image and then slide and rotate the template until the energy within the template is maximized. For example, an approach developed at Massachusetts Institute of Technology Lincoln Laboratory (MIT/LL) operates in such a manner. This is disclosed in a paper by L. Novak et al. entitled "Performance of a high-resolution polarimetric SAR automatic target recognition system," Lincoln Laboratory Journal, vol. 6, no. 1, pp. 11–24, Spring 1993.

As with the MIT/LL discriminator, the Army Research Laboratory (ARL) false alarm mitigation stage also uses a binary correlation algorithm. The algorithm uses two series of masks. This is disclosed in a paper by G. Stolovy et al. entitled "An overview of the ARL end to end software based synthetic aperture radar automatic target recognition workstation," presented at the Sensors and Electron Devices Symposium, U.S. Army Research Laboratory, January 1997. In this technique, a bright mask corresponds to the brightness areas in the target and a surrounding mask corresponds to dark areas or clutter surrounding the target. Each template has associated offset and threshold parameters. The shape of the template change considerably with target azimuth. Forty templates are used to span a full 360 degrees in azimuth.

There are problems with these two methods. A major problem is that these estimations are computationally intensive. For M targets, they require M different templates. The M templates are translated and rotated to cover the entire image over a full 360 degrees. Another problem is that the estimation performance is degraded if the target size is not provided.

Accordingly, it is an objective of the present invention to provide for an improved method for target azimuth aspect estimation for use with imaging systems such as synthetic aperture radar, forward looking infrared, and laser radar systems, and the like, and a target acquisition system using the improved method.

SUMMARY OF THE INVENTION

To accomplish the above and other objectives, the present invention provides for a Radon transform based method for target azimuth aspect estimation. The present invention uses a Radon transform-based technique for target azimuth aspect angle estimation and target shape measurement. A Radon transform is applied to a binary (N×N pixels) target chip to extract target features that are then used to measure length, width, and diagonal features of the target. In parallel, these features are used to estimate the azimuth aspect angle, or size, of the target. The Radon transform-based method is effective in discriminating targets from clutter. Furthermore, the method is also very time efficient and highly flexible in its operation because the features can automatically account for any target rotation or shift. The present invention also provides for a target acquisition system that employs the Radon transform based method for target azimuth aspect estimation.

BRIEF DESCRIPTION OF THE DRAWINGS

The various features and advantages of the present invention may be more readily understood with reference to the following detailed description taken in conjunction with the accompanying drawing, wherein like reference numerals designate like structural elements, and in which:

FIG. 5 illustrates a detailed block diagram of the Radon transform based target discrimination method of the present invention; and FIG. 6 illustrates a high level description of target azimuth aspect angle estimation

DETAILED DESCRIPTION

Figure 1:
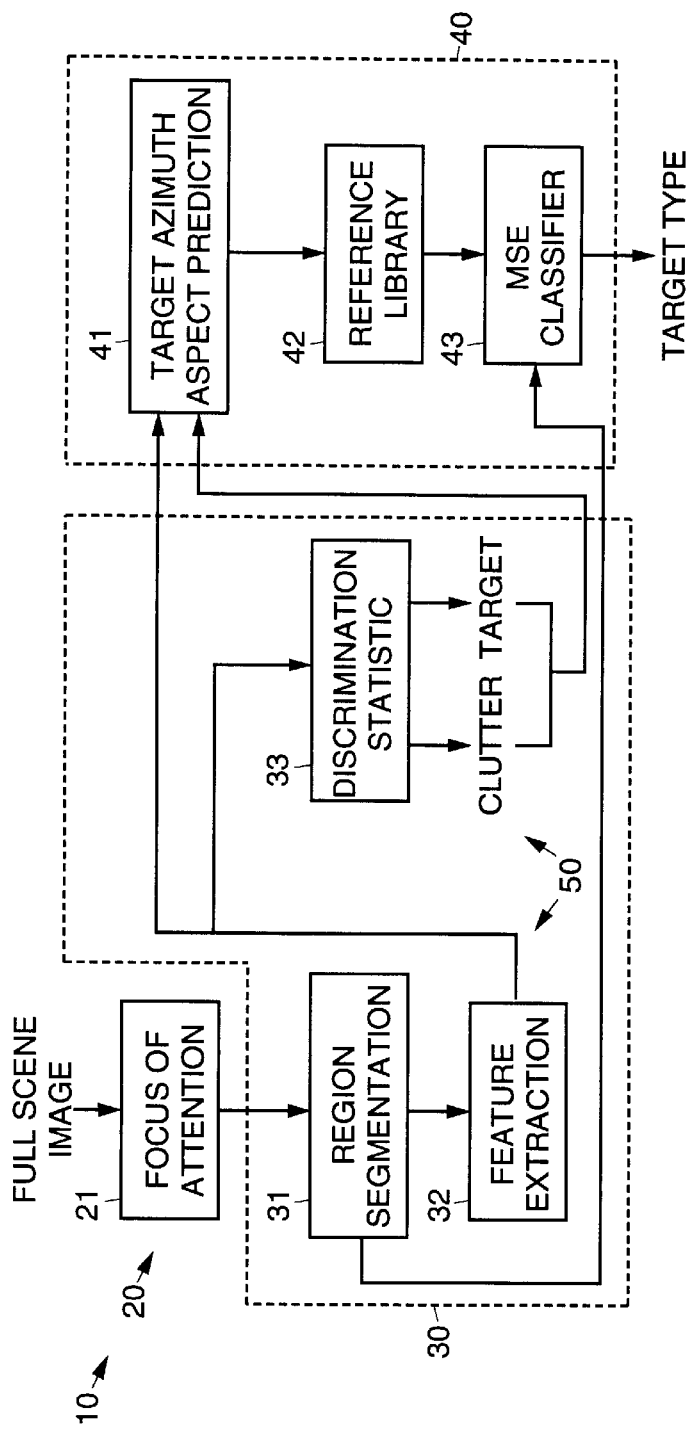
FIG. 1 illustrates an exemplary SAR automatic target recognition system in which the present invention may be employed.

Referring to the drawing figures, FIG. 1 illustrates an exemplary synthetic aperture radar (SAR) automatic target recognition (ATR) system 10 in which the present invention may be employed. The SAR automatic target recognition system 10, and in particular, a target discrimination method 50 implemented therein that is based on features extracted from a Radon transform. The automatic target recognition problem is that of automatically detecting target location and classifying target types in a short period of time without the direct intervention of human operators.

The SAR automatic target recognition system 10 has three basic stages, including a detection stage 20, a discrimination stage 30, and a template based classification stage 40. The detection stage 20 comprises a focus of attention (FOA) algorithm 21 that is designed to highlight possible target locations in a full scene image in a fast and efficient manner. The discrimination stage 30 is implemented using the present Radon transform based discrimination or feature extraction method 50. The Radon transform-based feature extraction method 50 takes areas located by the FOA algorithm 21 and discriminates them as targets or clutter.

The discrimination stage 30 includes region segmentation 31, feature extraction 32, and discrimination statistic generation 33. The final and most computationally demanding of the stages is the template based target classification stage 60. The template based target classification stage 40 identifies targets as predetermined types. The classification stage 40 contains target azimuth aspect prediction 41, reference library modeling 42, and a mean square error (MSE) classifier 43.

Details of the focus of attention algorithm 21 for target detection and location is described in a paper by Quoc H. Pham, et al., entitled "A reduced false alarm rate CFAR-based prescreener for SAR ATR," presented at the Sensors and Electron Devices Symposium, Army Research Laboratory,} January 1997. The FOA algorithm 21 has components at three levels. The first level is to extract three features from a grayscale image. These features are then combined by a logical AND operator to produce a binary image. The first feature is designed to eliminate areas in the image that are most unlikely to contain targets, such as the dark. The second feature is used to highlight areas that have higher brightness in comparison to surrounding areas.

The third feature plays a key role in representing the most notable characteristic of SAR targets, which is the high density of bright returns. The second component is a rank order filter to remove isolated bright returns, typically random noise. The final component is a size target discriminator to reject clutter larger or smaller than the expected target.

The Radon transform-based feature extraction method 50 is used to estimate length and width of the target to discriminate the object as target or clutter. The classification stage 40 performs gray scale correlation on full resolution sub-image chips. Pattern matching references are constructed by averaging five consecutive spotlight mode images of targets collected at one-degree azimuth increments. Morphology operations and feature clustering are used to produce accurate image segmentation. The target aspect is estimated to reduce the pose hypothesis search space.

The automatic target recognition system 10 has been tested using a public target MSTAR database. This testing will be discussed hereinbelow. The system 10 produces high discrimination and classification probabilities with relatively low false alarm rate.

Figure 2:
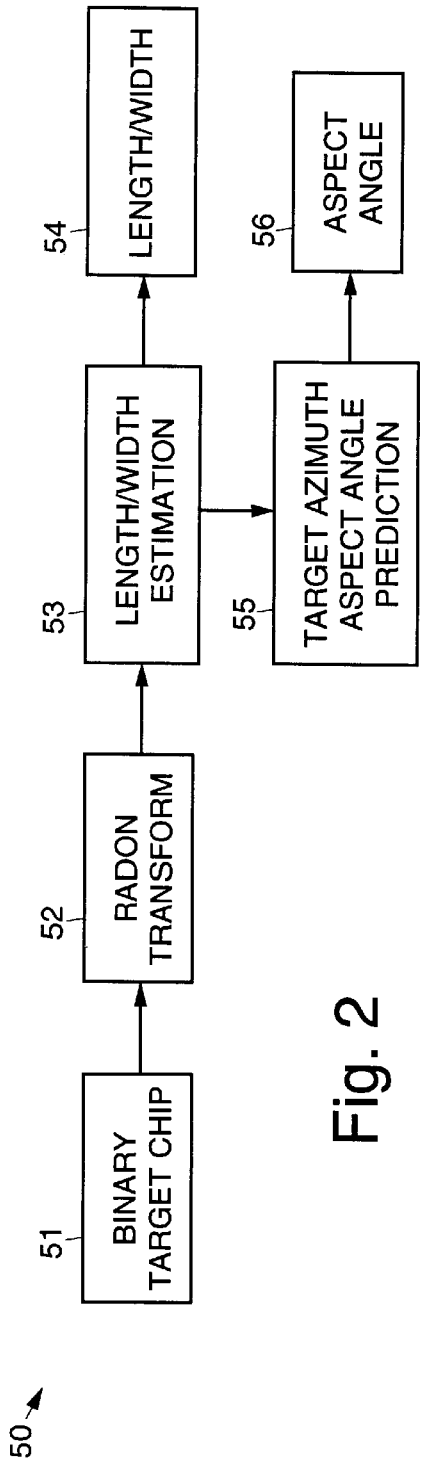
FIG. 2 is a block diagram that illustrates a Radon transform-based feature extraction method in accordance with the principles of the present invention for use in target azimuth aspect estimation.

FIG. 2 is a block diagram that illustrates details of a Radon transform-based feature extraction method 50 in accordance with the principles of the present invention for use in target azimuth aspect estimation, such as in the system 10 shown in FIG. 1. The Radon transform-based method 50 comprises a cascade of stages involving successive applications of Radon transform based feature extraction, length/width estimation, and target azimuth aspect prediction.

More particularly, the Radon transform-based method 50 comprises acquisition 51 of a binary target image chip, which is a block of N×N pixels of a target image area mapped by a synthetic aperture radar system, for example. The N×N pixels of the binary target chip are then processed 52 by a two-dimensional Radon transform to extract target features therefrom.

The length, width, and diagonal of the target are then estimated 53. The estimate 53 outputs the length and width 54 of the target. In parallel, the length, width, and diagonal of the target are used to estimate 55 or predict 55 the azimuth aspect angle, or size, of the target. The estimate 55 outputs the aspect angle 56 of the target.

The length and width estimation 53 is accomplished as follows. In order to measure the target length and width, the Radon transform 52 is applied on the binary image chip containing only the target region at 180 different project angles, θ. The two-dimensional Radon transform of an image, f(n,m), is computed as $$Rf(\rho, \theta) = \sum_{n=-N}^{N} \sum_{m=-M}^{M} f(n, m)\delta(\rho - n\cos\theta - m\sin\theta), \quad (1)$$

where θ has a range of 0 to 180 degrees and ρ has a range of 0 to $\sqrt{N^2+M^2}$ pixels. N and M correspond to the size of the target chip.

The target width and diagonal are estimated 53 by searching for which projection angles have maximum and minimum heights. The height of each projection is extracted by finding the maximum of Rf(ρ,θ) for every projection angle θ. The estimations are described by $$W = \min_{\theta}\left(\max_{\rho}(Rf(\rho, \theta))\right) \text{ and } D = \max_{\theta}\left(\max_{\rho}(Rf(\rho, \theta))\right), \quad (2)$$

where W is target width and D is target diagonal. Assuming target can be modeled by a rectangle, its length, L, can be computed as $$L=\sqrt{(D^2-W^2)}. \quad (3)$$

Figure 3A:
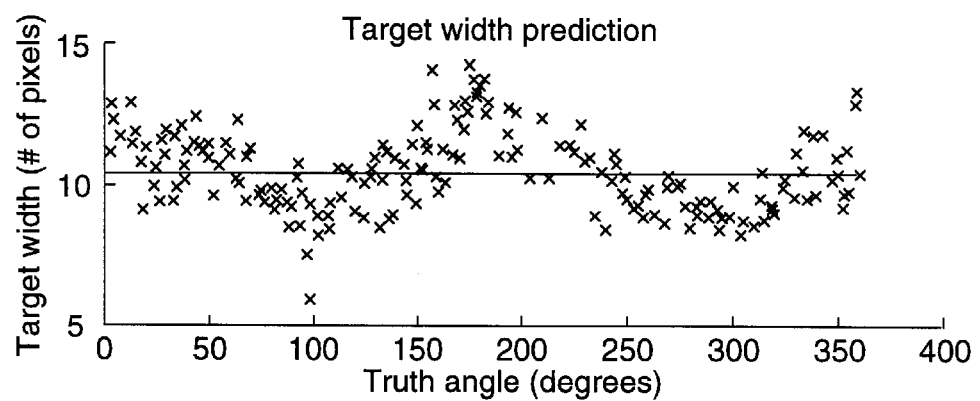
FIGS. 3a and 3b illustrate examples of target length and width estimation.
Figure 3B:
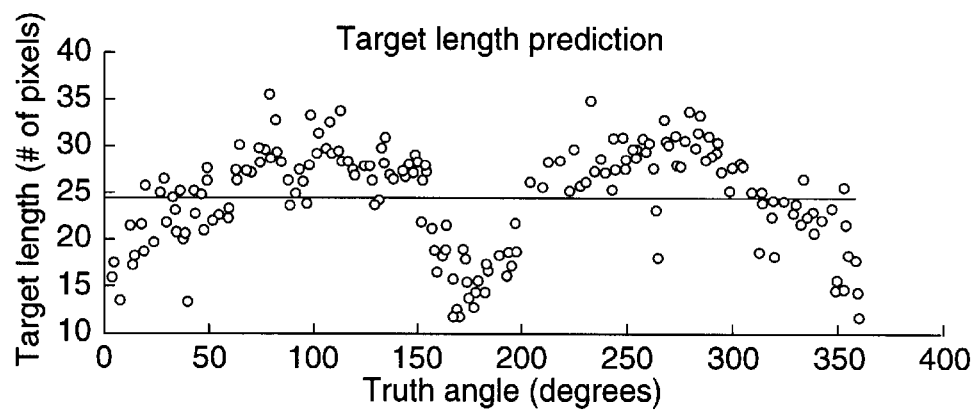
Figure 4:
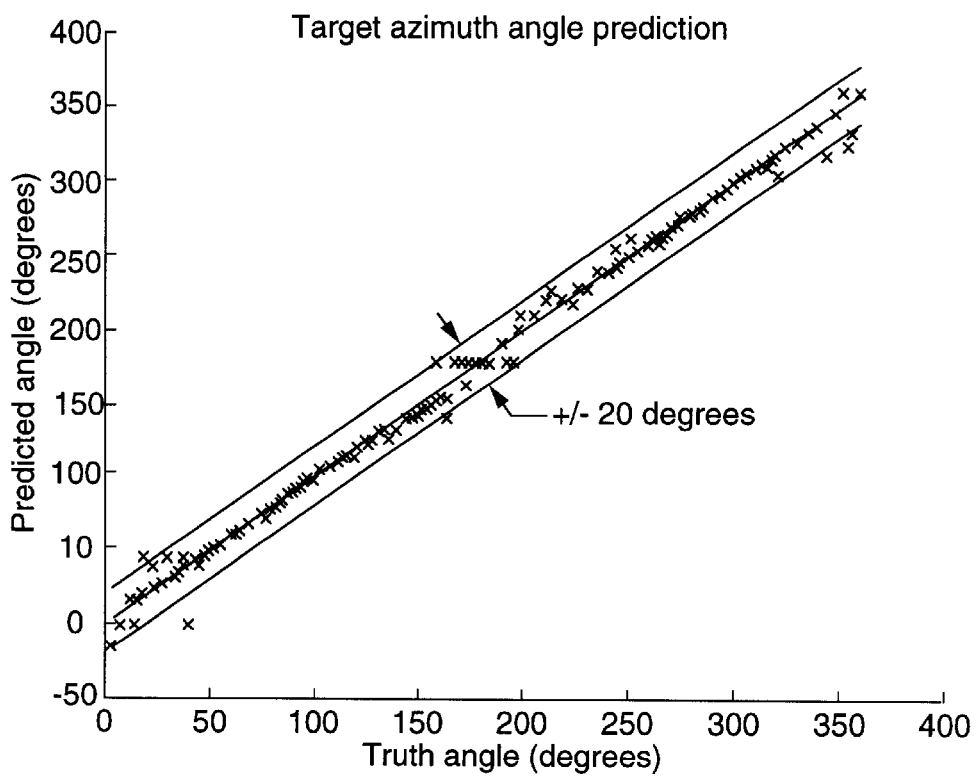
FIG. 4 illustrates performance example of target azimuth aspect angle estimation.

The target azimuth aspect prediction 55 or estimation 55 is accomplished as follows. However, before the target azimuth aspect angle estimation 55 is described, some brief observations regarding the relationship between the target length/width features and the target azimuth aspect angle are presented. FIGS. 3a and 3b illustrate examples of target length and width estimation. FIG. 4 illustrates performance example of target azimuth aspect angle estimation.

As is shown in FIGS. 3a and 3b, targets at azimuth angles of 330–30 degrees and 150–210 degrees often have small length and large width. The difference between the length and width at these angles is less than six pixels. On the other hand, targets at other azimuth aspect angles usually have a long length and a short width. For this reason, the target azimuth aspect angle, $\theta_t$, may be based upon the rule:

$$\theta_t = \begin{cases} 179 & \text{if } |L - W| < 6 \\ \theta_p & \text{otherwise,} \end{cases}$$

where $\theta_p$ is the predicted azimuth aspect angle, and L and W are the target length and width.

The predicted azimuth aspect angle is calculated as follows. First, a search is made for two, eleven projected angles, $\theta_1$ (1:11) and $\theta_2$ (1:11), whose heights are near to the target length and diagonal. One projected angle corresponds to target length and the other projected angle corresponds to the target diagonal. In some cases where the target is rectangular in shape, it may not be necessary to search dataset $\theta_2$ (1:11). The two, eleven azimuth aspect angles, are then sorted in ascending order to produce a new set of two, eleven angles, $\hat{\theta}_1(1:11)$ and $\hat{\theta}_2(1:11)$. The new set of angles is then used to predict the target azimuth aspect angles, $\theta_L$ and $\theta_D$, with respect to the target length and diagonal. The two angles, $\theta_L$ and $\theta_D$ are estimated by locating majority angles that occur most frequently in the datasets $\hat{\theta}_1(1:11)$ and $\hat{\theta}_2(1:11)$. Mathematically, these are expressed by $$\theta_L = \underset{\theta \in \hat{\theta}_1}{\exists} \left(\max(Rf(\rho, \hat{\theta}_1(1:11))) - L\right) \text{ and} \quad (5)$$

$$\theta_D = \underset{\theta \in \hat{\theta}_2}{\exists} \left(\max(Rf(\rho, \hat{\theta}_2(1:11))) - D\right),$$

where ∃ denotes majority estimation.

Some predicted angles have an error of 30 to 40 degrees. To correct this problem, binary rectangular template correlation matching is applied to the target binary image chip with template size of L×W pixels. The template is spanned from $\theta_L$ to $\theta_D$ with increments of 5 degrees to search for the best match. The angle giving the smallest mean square error is the target aspect angle. The binary correlation matching is defined as $$\theta_p = \min_{\theta \in (\theta_L, \theta_D)} \sum_{n,m} (f(n,m) - r_\theta(n,m)),$$

where $r_\theta(n,m)$ is the template reference at $\theta$. The target azimuth aspect angle prediction performs well after binary correlation matching. Since the Radon transform-based target azimuth aspect estimation method 50 does not provide target direction, there is a 180 degree angle ambiguity. The predicted angle is within +/−20 degrees of the true aspect angle of the target as is shown in FIG. 4. The resulting performance is improved if the target has of rectangular shape.

Additional details of the Radon transform based target discrimination using the Radon transform based discrimination and template based target classification algorithm 50 will now be described. Synthetic aperture radar automatic target recognition development by the assignee of the present invention has concentrated on identifying patterns with prestored target signatures. The measured attributes include size, shape, spatial distribution of reflected power, and dimensionality. Heretofore, there has been no method to develop discrimination features to exploit these attributes in any optimal fashion. The present discrimination algorithm 50 or method 50 for SAR targets is based on using the Radon transform. The discrimination algorithm 50 exploits target texture and shape information such as length, width, and standard deviation features, to discriminate a target from clutter. A detailed block diagram of the Radon transform based target discrimination method 50 is shown in FIG. 5.

Referring to FIG. 5, region segmentation will be discussed. The output of the FOA stage 20 includes small regions (target chips) extracted from a full scene image. The target chips are segmented 31 (FIG. 2) into one of three classes: background, target shadow, and target region. The segmentation 31 is performed using two parameter constant false alarm rate (CFAR) detection 61 followed by morphology operations 62 and a feature clustering technique 63. The two parameter CFAR detection rule is defined as $f(n,m)=1$ if $(x(n,m-\mu_c/\sigma_c) \geq Th_1$; 2 if $(x(n,m-\mu_c/\sigma_c) \leq Th_2$; 0 otherwise, where $x(n,m)$ is the amplitude of a test pixel. $\mu_c$ and $\sigma_c$ are the estimated mean and standard deviation of the pixels contained within a CFAR window. $Th_1$ and $Th_2$ are CFAR constants. 0 represents background, 1 denotes a target, and 2 symbolizes a shadow. The morphology operation 62 connects disjoint target pixels while screening out noise and extraneous features. The morphology operation 62 includes a cascade of stages involving successive applications of dilations, erosions, and rank filtering with a (3×3) structure element. The dilation of a two-dimensional image f(n,m) is written as $$f_d B(n,m) = \max_{i,j \in B} \{f(i+n, j+m)\}$$

where $f_d$ is an input set in the image domain D, B is a set of binary structuring elements, and the subscript "d" denotes the dilation operator. The erosion operator is the dual operator of the dilation operator. It is defined as $$f_e B(n,m) = \min_{i,j \in B} \{f(i+n, j+m)\}$$

where $f_e$ denotes the erosion operator. The rank filter is a parent of the dilation and erosion operators and is expressed as Rank(f,B,K)(n,m)=1 if $\Sigma\{f(i+n,j+m)\} \geq K$, and 0 otherwise, where K is a rank order parameter and $i,j \in B$. The rank filter becomes an erosion operator when K is equal to 1.

After spurious pixels are suppressed and disjoint pixels are filled, a large amount of pixels not belonging to target or shadow regions still remain. Target length and width estimators do not perform well if these regions are present. An issue relating to the question of how to reject those regions without destroying target and its shadow features must be resolved. To resolve this issue, feature clustering 63 is used to classify groups of binary image by group size. If the pixel at (n,m) is labeled as target or its shadow, then four its neighbor pixels at (n−1,m−1), (n,m−1), (n−1,m), and (n−1, m+1) are examined to determine if they these either belong to target, shadow or clutter. Following the pixel labeling operation, target chip is clustered 63 into multi-groups. The groups which have a large number of clusters are the ones belonging to the target or shadow regions.

The Radon transform 52 is applied to a binary image chip in the manner described above using the equation given above for the two-dimensional Radon transform of the image, f(n,m). The height of each projection is extracted 53 or estimated 53 by finding the maximum of Rf$\rho,\theta$) for every projection angle $\theta$ in the manner described above. The target width and diagonal are then estimated by searching for which projection angles have maximum and minimum heights using the estimates discussed above.

The textural feature extractor 66 will now be discussed. There are typically several very bright returns within the body of the target. These bright returns produce large variance values for relatively small regions of the image. In contrast, clutter is usually fairly uniform over smaller local regions. Therefore, a standard deviation feature is a good candidate to distinguish target from clutter. The target standard deviation is computed as $$Std(f) = \sqrt{\left(\frac{(S_2 - S_1^2/N)}{N}\right)}$$

where $$S_1 = \sum_N \sum_M (10 * \log f(n,m)) \text{ and } S_2 = \sum_N \sum_M (10 * \log f(n,m))^2.$$

The discrimination statistic 68 will now be discussed. The final step in discrimination stage 40 is to combine the features of the selected subset into a discrimination statistic. In this step, a decision is made as to whether the object should be labeled a target or clutter. A vector quantization (VQ) approach is used to solve this problem. The vector quantization approach is known in the are as a data compression technique. However, the principles and advances in vector quantization can be applied effectively to discrimination and classification problem. The vector quantization method uses training data to establish initial decision surfaces in feature space, which are specified by a codebook. To construct and initialize the codebook, training data is clustered for a given codebook according to a predefined boundary. The rule is $$Y^{l+1}(n) = X_k(n)$$

where $$k = \max_{j \in X} \min_{i \in Y} \sum_n \left| \frac{X_j(n) - Y_i^l(n)}{Y_i^l(n)} \right|,$$

and $Y^0(n) = X_0(n)$. X is the input training data, Y are the code vector, and L is number of code vectors. This rule is applied in a generalized Lloyd (LBG) design framework to produce the codebook. The LBG algorithm is illustrated in a reference A. Gersho and R. Gray, entitled "Vector Quantization and Signal Compression," Boston, Kluwer Academic Publishers, 1992.

The size of the codebook is optimized by increasing the number of code vectors until every cluster is nearly homogeneous. Here, vector quantization is used to discriminate the target from clutter. Therefore, there is only one codebook for all targets. The codebook has a length of about 100–200. This number depends only on how well target signatures are homogeneous. No codebook is designed for clutter because clutter signatures vary considerably.

During the testing phase of the present invention, the vector quantization searches for the most likely feature vector over all possible feature vector models according to a maximum likelihood criterion. The discrimination between target and clutter depends on whether the mean square error is less than or greater than a given threshold. The threshold is adjusted to guarantee a minimum probability of detecting the true targets.

The template based target classification algorithm employed in the system 10 of FIG. 1 will now be discussed. The success of the classification stage 50 hinges on the selection of features that provide the best discriminating power between targets and clutter for different types of targets. Even the best classifiers cannot perform effectively if given inadequate features. In addition, the classifier must operate efficiently, which rules out approaches such as template matching at each 1 degree aspect angle, that can be overly complex and computationally burdensome. In the present invention, the classification follows a template-based approach with the target azimuth aspect prediction to increase the speed of MSE classification search.

The target azimuth aspect estimator or predictor 55 will now be discussed. The orientation of the target can be estimated in many different ways. The MIT/LL approach mentioned in the Background section places a target-sized rectangular template on the image and then slides and rotates the template until the energy within the template is maximized. This is discussed in the L. Novak, et al. paper mentioned in the Background section. As in the MIT/LL discriminator, the ARL false alarm mitigation stage is also a binary correlation algorithm. The algorithm uses two series of masks. This is discussed in the Stolovy, et al. paper mentioned in the Background section.

The bright mask corresponds to the brightness areas in the target and the surround mask corresponds to the dark areas or clutter surrounding the target. Each template has associated offset and threshold parameters. The shape of the templates changes considerably with target azimuth. Forty templates are used to span the full 360 degree range in azimuth. In the present invention, the target length and diagonal features are extracted from the Radon transform to estimate the target azimuth aspect angle. A high level description of target azimuth aspect angle estimation is shown in FIG. 6.

Template generation will now be discussed. A mean squared error (MSE) pattern matching classifier 43 (FIG. 1) is used to reject cultural false alarms caused by manmade clutter and to classify the remaining target detections by vehicle type. The pattern matching references used in the classifiers were constructed by averaging five consecutive spotlight mode images of a target collected at 1 degree increments of azimuth, yielding 72 smoothed references for each of the targets. The template is partitioned into three regions representing target, shadow, and clutter.

To construct the reference template for the MSE classifier 43, the dB pixel values of bare target training images are into the region segmentation to extract only the target pixels and the target shadow pixels. All pixels not under the target mask or the target shadow region are used to calculate an average dB clutter level, $\hat{\mu}_c$. The target image, h(n,m), is then normalized by $$g(n,m) = h(n,m) - \hat{\mu}_c.$$

With this normalized scheme, the average clutter has been removed but the energy of the reference target relative to clutter background is retained.

Reference templates are constructed on two levels. First stage represents the target type while second stage reports to target azimuth aspect angle. For three different targets, the reference library 42 contains 216 reference templates.

The MSE classifier 43 will now be discussed. When a region of interest (ROI) is passed to the MSE classifier 43, the target pixels and its shadow pixels are extracted. The mean clutter level is calculated and the ROI is then normalized as in the template generation. At the same time, the angle from the target azimuth aspect prediction is recalled. The information is then to reference library 42 for retrieving the templates within azimuth +/−20 degrees. Next, the mean square error is calculated for all reference templates. For a given reference template $r_{ij}(n,m)$, the error, $e_{ij}$, is calculated for the tested image, x(n,m), by $$e_{ij} = \sum_n \sum_m \frac{|r_{ij}(n,m) - x(n,m)|}{N}$$

where N is the number of pixels in the reference template window, and i and j response to target type and target azimuth aspect angle, respectively. Finally, the minimum of error, e, is measured $$e = \min_i (e_{ij}).$$

The target is classified as object i if e belongs to i.

Performance results will now be discussed. A public release MSTAR target database was used in the development of the system 10. This database is composed of seven distinct target objects: three T-72's (sn-132, sn-812, and sn-s7), three BMP-2's (sn-9563, sn-9566, and sn-c21), and one BTR-70 (sn-c71). Target azimuth pose angles for a full 360 degrees are included in one to two degree increments. Two sets of chips for training and testing exist for each target azimuth pose angle. The training chips are taken at a 17 degrees depression angle while the chips for testing are taken at 15 degrees.

The performance of the system 10 was tested in two different experiments. In experiment 1, all targets on different series number in the training dataset are used for generating target reference templates. It was found that the MSE classifier 43 is able to reach a 99% correct classification for the training set and 96% correct classification for the testing set as shown in Table 1.

TABLE 1

| True/Classified as | BMP-2 | T-72 | BTR-70 |
|---|---|---|---|
| BMP-2 | 96.2% | 1.6% | 2.2% |
| T-72 | 1.3% | 96.6% | 1.1% |
| BTR-70 | 2.8% | 1.6% | 95.8% |

In experiment 2, targets on two different series numbers are used to train and test. For the case of the target reference templates trained on sn-132, sn-9563, and sn-c71 while testing on sn-812, sn-9566, and sn-c71, the classification performance remains the same. 95% correct classification was achieved as is shown in Table 2.

TABLE 2

| True/Classified as | BMP-2 | T-72 | BTR-70 |
|---|---|---|---|
| BMP-2 | 97.0% | 1.2% | 1.8% |
| T-72 | 6.6% | 92.2% | 1.2% |
| BTR-70 | 2.6% | 1.8% | 95.8% |

However, the classification performance degrades slightly for the case where reference templates on sn-132, sn-9563, and sn-c71 while testing on sn-s7, sn-c21, and sn-c71. Only 92.4% correct classification was achieved as is shown in Table 3.

TABLE 3

| True/Classified as | BMP-2 | T-72 | BTR-70 |
|---|---|---|---|
| BMP-2 | 96.2% | 2.6% | 1.2% |
| T-72 | 9.8% | 86.1% | 4.1% |
| BTR-70 | 3.6% | 1.6% | 94.8% |

However, the classification performance degrades slightly for the case where reference templates on sn-132, sn-9563, and sn-c71 while testing on sn-s7, sn-c21, and sn-c71. Only 92.4% correct classification was achieved as is shown in Table 3.

There are certain advantages provided by the present invention. The angle measurement can be determined faster using the Radon transform because the target features contain rotation and shift invariant properties. The Radon transform does not require retraining on a new target to determine length and width. There is reduced data storage since no reference template database is required and because the present method is not a template-based approach. The target length and width features enable the discrimination between targets and clutter. The use of target azimuth aspect angle estimation to speed up and facilitate obtaining mean square error pattern matching. Operationally, this reduces the time required for the collection vehicle to spend in the target area, thereby enhancing survivability. Additionally, the Radon transform allows faster, more efficient processing of target/clutter imagery which enables wider area coverage over a given time.

There are two primary uses envisioned for the present invention. The first use is in real-time tactical and reconnaissance platforms that include SAR automatic target recognition systems. The second use relates to automatic luggage inspection at commercial airports, for example. Thus, the present invention may be used in processing multi-spectral, FLIR (forward looking infrared) system, and LADAR (laser radar) type images.

Thus, a system and method for computing the degree of translational offset between corresponding blocks extracted from images acquired by different sensors so that the images can be spatially registered have been disclosed. It is to be understood that the above-described embodiments are merely illustrative of some of the many specific embodiments that represent applications of the principles of the present invention. Clearly, numerous and other arrangements can be readily devised by those skilled in the art without departing from the scope of the invention.

What is claimed is:

1. A method for use in target azimuth aspect estimation, comprising the steps of:

acquiring a binary image chip containing a predetermined region comprising a block of pixels of an image area with a target located therein;

processing the pixels of the binary image chip containing a predetermined region using a two-dimensional Radon Transform to extract target features therefrom;

estimating the length, width, and diagonal of the target using the extracted target features; and estimating azimuth aspect angle, or size, of the target using the length, width, and diagonal of the target.

2. The method recited in claim 1 wherein the binary image chip containing a predetermined region comprises an image area with a target located therein mapped by a synthetic aperture radar system.

3. The method recited in claim 1 wherein the binary image chip containing a predetermined region comprises an image area with a target located therein derived from a forward looking infrared system.

4. The method recited in claim 1 wherein the binary image chip containing a predetermined region comprises an image area with a target located therein derived from a laser radar system.

5. The method recited in claim 1 wherein the features extracted from Radon transform a re processed to classify the target type.

6. The method recited in claim 1 wherein the features extracted from Radon transform are processed to search for a target index.

7. An automatic target recognition system for use with a synthetic aperture radar system to automatically detect target locations and classify target types, comprising:

a detection stage comprising a focus of attention algorithm for identifying possible target locations in a full scene image;

a discrimination stage comprising a Radon transform based feature extraction method that processes areas located by the focus of attention algorithm and discriminates the features as targets or clutter; and a template based classification stage for identifying targets as predetermined types.

8. The system recited in claim 7 wherein the discrimination stage comprises region segmentation, feature extraction, and discrimination statistic generation.

9. The system recited in claim 8 wherein region segmentation is performed using two parameter constant false alarm rate detection followed by morphology operations and feature clustering.

10. The system recited in claim 9 wherein constant false alarm rate detection is implemented using a two parameter constant false alarm rate detection rule defined as $$f(n,m)=1 \text{ if } (x(n,m-\mu_c/\sigma_c) \geq Th_1;\ 2 \text{ if } (x(n,m-\mu_c/\sigma_c) \leq Th_2;\ 0 \text{ otherwise,}$$

where x(n,m) is the amplitude of a test pixel, $\mu_c$ and $\sigma_c$ are the estimated mean and standard deviation of the pixels contained within a constant false alarm rate window, $Th_1$ and $Th_2$ are constant false alarm rate constants, 0 represents background, 1 denotes a target, and 2 symbolizes a shadow.

11. The system recited in claim 8 wherein the morphology operation comprises a cascade of stages including successive applications of dilations, erosions, and rank filtering.

12. The system recited in claim 8 wherein the classification stage contains target azimuth aspect prediction, reference library modeling, and a mean square error classifier.

* * * * *